(12) United States Patent
Ramanathan et al.

(10) Patent No.: US 11,485,578 B2
(45) Date of Patent: Nov. 1, 2022

(54) UTILIZATION OF MULTIPLE ORDER SORTATION SYSTEMS

(71) Applicant: Target Brands, Inc., Minneapolis, MN (US)

(72) Inventors: Jayabarathi Ramanathan, Minneapolis, MN (US); Matthew Dunaj, Minneapolis, MN (US); Mitchell Sanssouci, Minneapolis, MN (US); Stephanie Westrich, Minneapolis, MN (US); Josh McKinley, Minneapolis, MN (US); Ethan Coyne, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 410 days.

(21) Appl. No.: 16/883,692

(22) Filed: May 26, 2020

(65) Prior Publication Data

US 2021/0061568 A1 Mar. 4, 2021

Related U.S. Application Data

(60) Provisional application No. 62/895,753, filed on Sep. 4, 2019.

(51) Int. Cl.
| | |
|---|---|
| *B65G 1/137* | (2006.01) |
| *G06Q 30/06* | (2012.01) |
| *B65G 1/06* | (2006.01) |

(52) U.S. Cl.
CPC .......... *B65G 1/1376* (2013.01); *B65G 1/065* (2013.01); *G06Q 30/0635* (2013.01)

(58) Field of Classification Search
CPC combination set(s) only.
See application file for complete search history.

(56) References Cited

U.S. PATENT DOCUMENTS

| | | | |
|---|---|---|---|
| 3,703,725 A | 11/1972 | Gomersall et al. | |
| 5,216,613 A | 6/1993 | Head | |
| 9,824,318 B1 | 11/2017 | Lusthaus et al. | |
| 2003/0208392 A1* | 11/2003 | Shekar | G06Q 10/10 705/7.22 |
| 2016/0221762 A1* | 8/2016 | Schroader | B65G 47/31 |
| 2018/0339865 A1* | 11/2018 | Schroader | G06V 20/52 |
| 2021/0390062 A1* | 12/2021 | Wen | G06F 12/0875 |

* cited by examiner

*Primary Examiner* — Kyle O Logan
(74) *Attorney, Agent, or Firm* — Fish & Richardson P.C.

(57) ABSTRACT

Systems and methods can enhance efficiencies of order fulfillment processes. For example, this document describes systems and methods for optimizing the efficiency of multiple order sortation process lines to expedite order processing in a cost-effective manner. In some embodiments, this innovation includes an efficient method for loading or filling the capacity of multiple parallel order sortation process lines so that they operate at peak efficiently and the operators are utilized at a high level. Additionally, the systems and methods promote efficiency enhancements of order sortation equipment by reducing the potential for downtime due to material flow interferences.

20 Claims, 5 Drawing Sheets

UTILIZATION OF MULTIPLE ORDER SORTATION SYSTEMS

CROSS-REFERENCE TO RELATED APPLICATIONS

This application claims the benefit of U.S. Provisional Application Ser. No. 62/895,753, filed Sep. 4, 2019. The disclosure of the prior application is considered part of (and is incorporated by reference in) the disclosure of this application.

TECHNICAL FIELD

This document relates to systems and methods for enhancing efficiencies of order fulfillment processes. For example, this document relates to systems and methods for optimizing the efficiency of multiple order sortation process lines to expedite order processing in a cost-effective manner.

BACKGROUND

Customers expect their orders to be fulfilled properly and promptly on a consistent basis. Second-day deliveries are now essentially an ordinary expectation, and same-day or next-day deliveries are becoming more standard. Highly efficient warehousing, order processing, and shipping processes are required to meet these increasingly higher levels of customer expectations.

The order fulfillment process refers to all the steps companies take from when they receive a customer order (which can include an order that is wholly or partly internal to the company, such as a store replenishment order) until the items are landed in customers' hands. Such steps can include, for example: the order is sent to the warehouse; a worker goes into the warehouse, finds the items in the order, and picks the items off the shelf; the order is packed for shipping; the order is shipped. Order processing involves picking (e.g., retrieval of items from where they are stored), order sortation, and packaging (e.g., getting the order ready to ship).

The use of order processing optimization is one way to increase the efficiency of an order fulfillment process. The goal of order processing optimization is to cut out inefficiencies of the order fulfillment process.

SUMMARY

This document describes systems and methods for enhancing efficiencies of order fulfillment processes. For example, this document describes systems and methods for optimizing the efficiency of multiple order sortation process lines to expedite order processing in a cost-effective manner. In some embodiments, this innovation includes an efficient method for loading or filling the capacity of multiple parallel order sortation process lines so that they operate at peak efficiently and the operators are utilized at a high level.

In one aspect, this disclosure is directed to a method of operating an order sortation process comprising a plurality of order sortation lines. The method includes: (i) receiving, by a control system of the order sortation process, one or more configuration parameters associated with the plurality of order sortation lines, wherein the one or more configuration parameters includes a threshold capacity level; (ii) controlling, by the control system, a conveyance system to convey items for orders being sorted by the order sortation process to a first order sortation line of the plurality of order sortation lines, wherein the one or more configuration parameters identifies the first order sortation line as a primary priority order sortation line; and (iii) in response to a utilization of the first order sortation line reaching the threshold capacity level, controlling, by the control system, the conveyance system to convey the items for the orders being sorted by the order sortation process to a second order sortation line of the plurality of order sortation lines, wherein the one or more configuration parameters identifies the second order sortation line as a secondary priority order sortation line.

Such a method may optionally include one or more of the following features. The method may also include, in response to the utilization of the first order sortation line falling below the threshold capacity level, controlling, by the control system, the conveyance system to convey the items for the orders being sorted by the order sortation process to the first order sortation line instead of to the second order sortation line. The method may also include, in response to the utilization of the first and second order sortation lines reaching the threshold capacity level, controlling, by the control system, the conveyance system to convey the items for the orders being sorted by the order sortation process to a third order sortation line of the plurality of order sortation lines. The one or more configuration parameters may identify the third order sortation line as a tertiary priority order sortation line. The method may also include, in response to the utilization of the first, second, and third order sortation lines reaching the threshold capacity level, controlling, by the control system, the conveyance system to convey the items for the orders being sorted by the order sortation process to the first, second, or third order sortation lines in a manner that attempts to equally utilize the first, second, and third order sortation lines in a balanced manner. The method may also include, in response to the utilization of the first, second, and third order sortation lines reaching full capacity levels, controlling, by the control system, the conveyance system to convey the items for the orders being sorted by the order sortation process to a fourth order sortation line of the plurality of order sortation lines. The one or more configuration parameters may identify the fourth order sortation line as a quaternary priority order sortation line. The method may also include, in response to the utilization of the first, second, or third order sortation line falling below the full capacity level, controlling, by the control system, the conveyance system to convey the items for the orders being sorted by the order sortation process to the first, second, or third order sortation line instead of to the fourth order sortation line. In some embodiments, the threshold capacity level is 50%. In some embodiments, the one or more configuration parameters identifies a third order sortation line as a tertiary priority order sortation line. The one or more configuration parameters may identify a fourth order sortation line as a quaternary priority order sortation line. The order sortation process may be a manual order sortation process. In some embodiments, the order sortation process is an automated order sortation process.

In another aspect, this disclosure is directed to order sortation system, that includes: (i) a conveyance system; (ii) a plurality of order sortation lines arranged to receive, from the conveyor, items for orders to be sorted by the order sortation system; and (iii) a control system configured to receive and utilize, for controlling the order sortation system, one or more configuration parameters associated with the plurality of order sortation lines. The one or more configuration parameters may include a threshold capacity level and a relative prioritization of first, second, and third order sortation lines of the plurality of order sortation lines.

Such an order sortation system may optionally include one or more of the following features. The conveyance system may comprise a conveyor. In some embodiments, the conveyance system comprises a plurality of mobile robots or automated guided vehicles. The control system may be configured to: (a) control the conveyance system to convey the items for the orders being sorted by the order sortation system to the first order sortation line, wherein the one or more configuration parameters identifies the first order sortation line as a primary priority order sortation line; and (b) in response to a utilization of the first order sortation line reaching the threshold capacity level, control the conveyance system to convey the items for the orders being sorted by the order sortation process to the second order sortation line of the plurality of order sortation lines. The one or more configuration parameters may identify the second order sortation line as a secondary priority order sortation line. In some embodiments, the control system is configured to, in response to the utilization of the first order sortation line falling below the threshold capacity level, control the conveyance system to convey the items for the orders being sorted by the order sortation process to the first order sortation line instead of to the second order sortation line. In particular embodiments, the control system is configured to, in response to the utilization of the first and second order sortation lines reaching the threshold capacity level, control the conveyance system to convey the items for the orders being sorted by the order sortation process to the third order sortation line of the plurality of order sortation lines. The one or more configuration parameters may identify the third order sortation line as a tertiary priority order sortation line. In some embodiments, the control system is configured to, in response to the utilization of the first, second, and third order sortation lines reaching the threshold capacity level, control the conveyance system to convey the items for the orders being sorted by the order sortation process to the first, second, or third order sortation lines in a manner that attempts to equally utilize the first, second, and third order sortation lines in a balanced manner. The control system may be configured to, in response to the utilization of the first, second, and third order sortation lines reaching full capacity levels, control the conveyance system to convey the items for the orders being sorted by the order sortation process to a fourth order sortation line of the plurality of order sortation lines. The one or more configuration parameters may identify the fourth order sortation line as a quaternary priority order sortation line. In some embodiments, the control system is configured to, in response to the utilization of the first, second, or third order sortation line falling below the full capacity level, control the conveyance system to convey the items for the orders being sorted by the order sortation process to the first, second, or third order sortation line instead of to the fourth order sortation line.

The systems and processes described here may be used to provide one or more of the following optional benefits. First, some embodiments provide an order fulfillment process that is more efficient, responsive, and agile so orders can be shipped to internal and external customers in a shorter timeframe than some current processes. Such a result can be accomplished, for example, through optimizing material flow through the order sortation process by reducing delays and interferences. Second, some embodiments of the systems and methods described herein are flexible and readily scalable to respond efficiently to increasing or decreasing order processing demands. Third, in some embodiments the labor costs associated with the order fulfillment processes can be reduced using the systems and processes described herein. Fourth, the systems and methods described herein can result in efficiency enhancements of order sortation equipment by reducing the potential for downtime due to material flow interferences. Fifth, the systems and methods described herein are flexible and adaptable so that multiple parallel order sortation process lines can be configured to operate in many different ways. The optimal configuration can be selected based on the volume of orders needing sortation during a particular day, shift, or partial-shift. Hence, the systems and methods facilitate efficient order sortation operations in spite of shifting requirements.

Other features, aspects and potential advantages will be apparent from the accompanying description and figures.

DESCRIPTION OF DRAWINGS

Like reference symbols in the various drawings indicate like elements

DETAILED DESCRIPTION

This document describes systems and methods for enhancing efficiencies of order fulfillment processes. For example, this document describes systems and methods for optimizing the efficiency of multiple order sortation process lines to expedite order processing in a cost-effective manner. In some embodiments, this innovation includes an efficient method for loading or filling the capacity of multiple parallel order sortation process lines so that they operate at peak efficiently and so that the operators are utilized at a high level.

Figure 1:
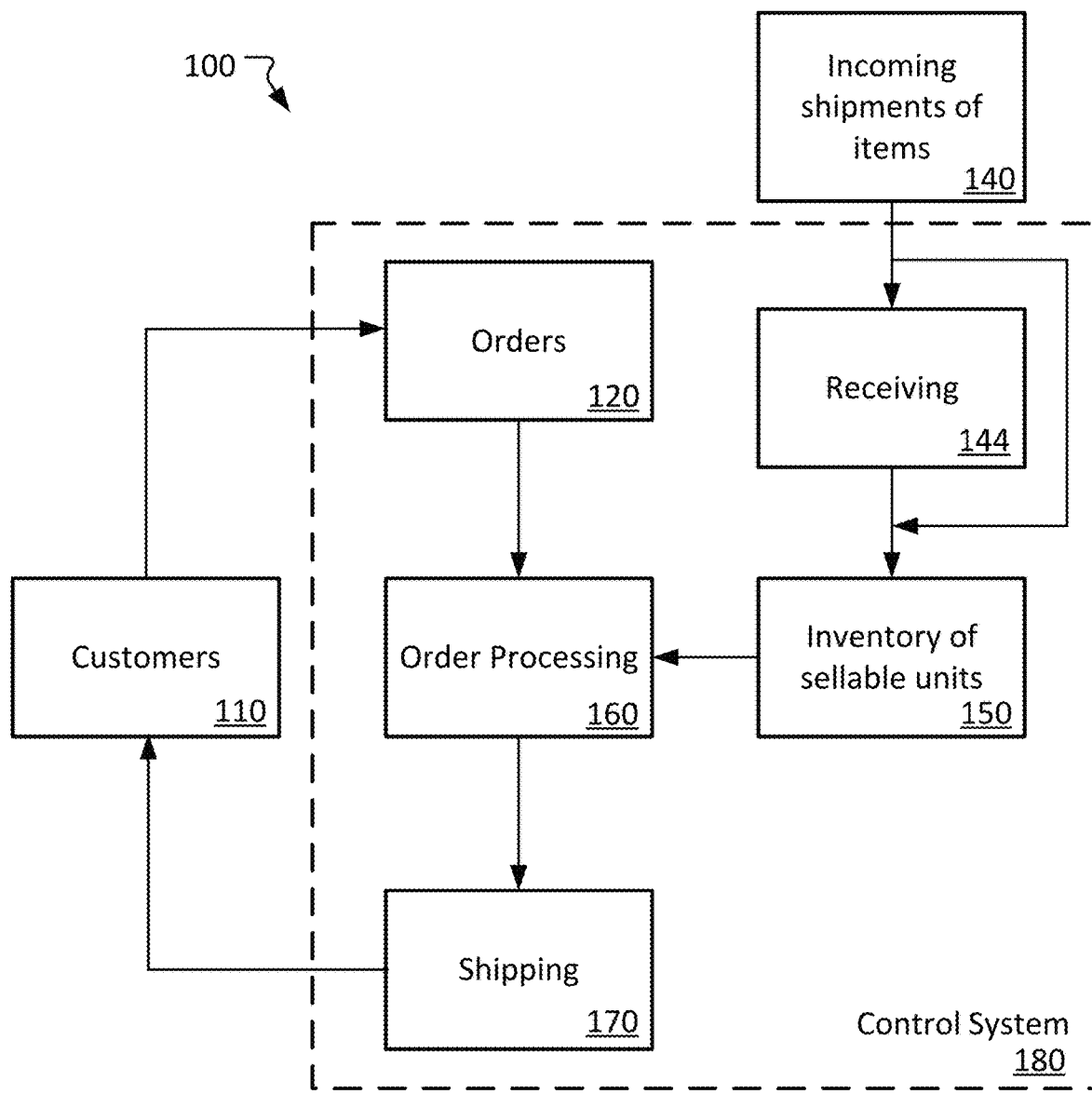
FIG. 1 is a highly simplified schematic diagram of a basic order fulfillment process.

FIG. 1 is a schematic diagram illustrating an example order fulfillment process 100. The order fulfillment process 100 may take place at a variety of different types of facilities such as, but not limited to, flow centers, distribution centers, warehouses, inventory storing locations, order fulfillment centers, receive centers, stores, cross-docking facilities, material handling facilities, and the like, and combinations thereof. In this disclosure, the term "flow center" may be used to refer to any and all such different types of facilities, and combinations thereof. In some examples, the order fulfillment process 100 takes place at a single facility. Alternatively, in some examples execution of the order fulfillment process 100 is distributed across two or more facilities. A flow center as described herein can be a portion of a multi-echelon supply chain.

Order fulfillment process 100 includes the daily replenishment and movement of inventory generated from real-time demand singles for in-store retail sales and direct-to-guest on-line sales fulfilled from a multi-echelon inventory-holding model at the correct unit of measure, using fast and easy material handling equipment that will create operational efficiency at every process step in the supply chain.

The flow of sellable items within the overall order fulfillment process 100 is driven by demand for those sellable items from customers 110. In this disclosure, the term "customers" will be used to broadly refer to a variety of different entities such as, but not limited to, individual consumers, retail stores (e.g., for stock replenishment), business partners, other flow centers, and the like.

Tangible orders 120 result from the demand for sellable items from the customers 110. An individual order 120 may be for one unit of a single sellable item, for multiple units of a single sellable item, for two or more different types of sellable items, for a case quantity, for a pallet load, and the like, and any and all possible permutations thereof. Whatever the order 120 includes, the goal of the order fulfillment process 100 is to ship (preferably in a single shipment) all of the sellable items included in the orders 120 in a timely and accurate manner. However, the scope of the order fulfillment process 100 also includes partial shipments that do not include all of the items included in an order 120.

The orders 120 are entered into a control system 180 (represented in FIG. 1 by the dashed-line boundary). In some examples, the control system 180 may be part of and/or may comprise a business management system such as, but not limited to, an enterprise resource planning (ERP) system, a materials management system, an inventory management system, a warehouse management system, one or more automation control systems, and the like, and combinations thereof. Accordingly, the control system 180 (or simply "control system 180") can, in some cases, broadly encompass multiple systems that can be situated locally, remotely, or situated both locally and remotely. The control system 180 can include hardware, software, user-interfaces, and so on. For example, the control system 180 may include one or more computer systems, data storage devices, wired and/or wireless networks, control system software (e.g., programs, modules, drivers, etc.), user interfaces, scanners, communication modules, interfaces for control communications with robots, and the like. Such scanners may include hand-held, mobile, and/or fixed readers that can scan, receive, or otherwise detect marks or tags (e.g., bar codes, radio frequency identification (RFID) tags, etc.) on individual sellable items or collections of sellable items (e.g., cases and totes) and communicate with a control station or stations of the control system 180. The scanners may also be able to scan, receive, or otherwise detect the marks or tags (e.g., bar codes, RFID tags, etc.) attached to or integrated with conveyance receptacles such as inventory totes and boxes.

Still referring to FIG. 1, incoming shipments of items 140 arrive at the flow center. In some cases, the incoming shipments of items 140 are processed by receiving 144 (e.g., the performance of inspections, quantity confirmations/reconciliations, inventory/order control system transactions, etc.). Afterwards, the items enter into inventory 150 of the flow center as sellable units. In some cases, some incoming items go directly from receiving 144 into inventory 150 (e.g., if the incoming items were transferred in from an affiliated facility at which the items were already in the inventory system). The types and quantities of the incoming items 140 may be controlled to keep a desired stock level of the sellable units in the inventory 150 of the flow center. In some cases, the types and quantities of the incoming items 140 may be the result of a proactive inventory transfer (e.g., "pushing" inventory), a reactive inventory transfer (e.g., "pulling" inventory), and/or other such inventory management techniques.

The sellable units in inventory 150 can be located in various types of storage accommodations such as racks, shelves, containers, vessels, carts, bins, totes, pallet lanes, and the like. Such storage accommodations can be individually identified and tracked by the control system 180. That is, the control system 180 can be used to keep track of the quantities in stock of the various sellable items in the inventory 150 and of the inventory location(s) of the various sellable items in the inventory 150. The sellable items in the inventory 150 can be stored in various receptacles such as, but not limited to, boxes, totes, pallets, baskets, bins, bags, and the like.

Next, in the step of order processing 160, the sellable item(s) included in the customer order 120 are compiled in preparation for shipment to the respective customer 110. This step includes order sortation processes as described below in the context of FIGS. 2-4.

To fulfill the customer orders 120, the one or more items specified in each order may be retrieved, or picked, from inventory 150. As described further below in reference to FIG. 2, the sellable items pertaining to the individual customer orders 120 may be delivered or conveyed to one or more areas in the flow center for sorting (order sortation) and compiling into one or more outbound shipping containers for the fulfillment of the respective customer orders 120. Outbound shipping containers containing the ordered sellable items are then transported to customers 110 at the step of shipping 170.

FIG. 1 and the foregoing description of the order fulfillment process 100 has provided a high-level overview of the operations of a flow center. Next, in reference to FIGS. 2-4, a more detailed description focused particularly on the operations of an order sortation system (which is part of order processing 160) will be provided.

Figure 2:
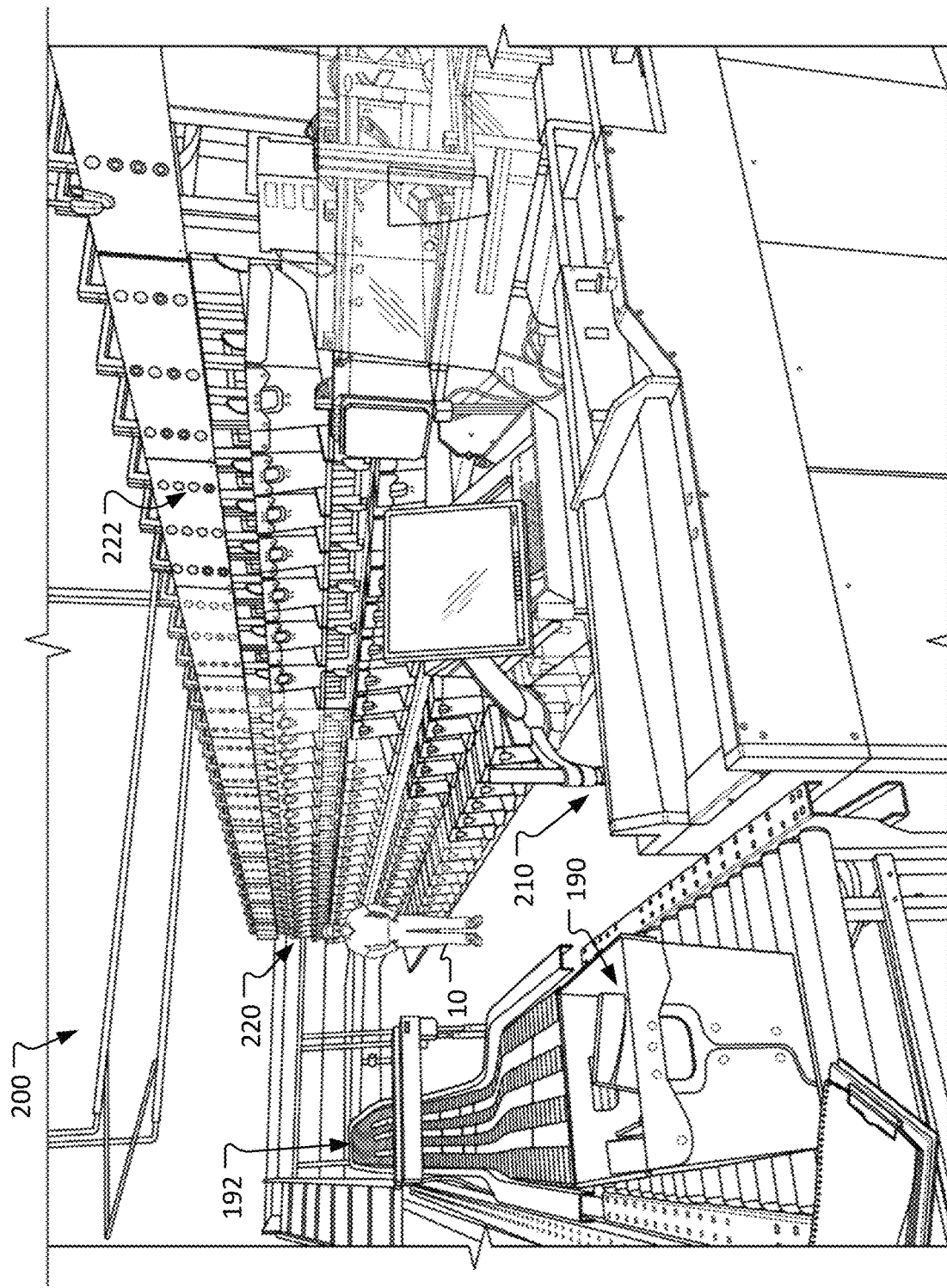
FIG. 2 is a depiction of an example order sortation system in accordance with some embodiments.
Figure 3:
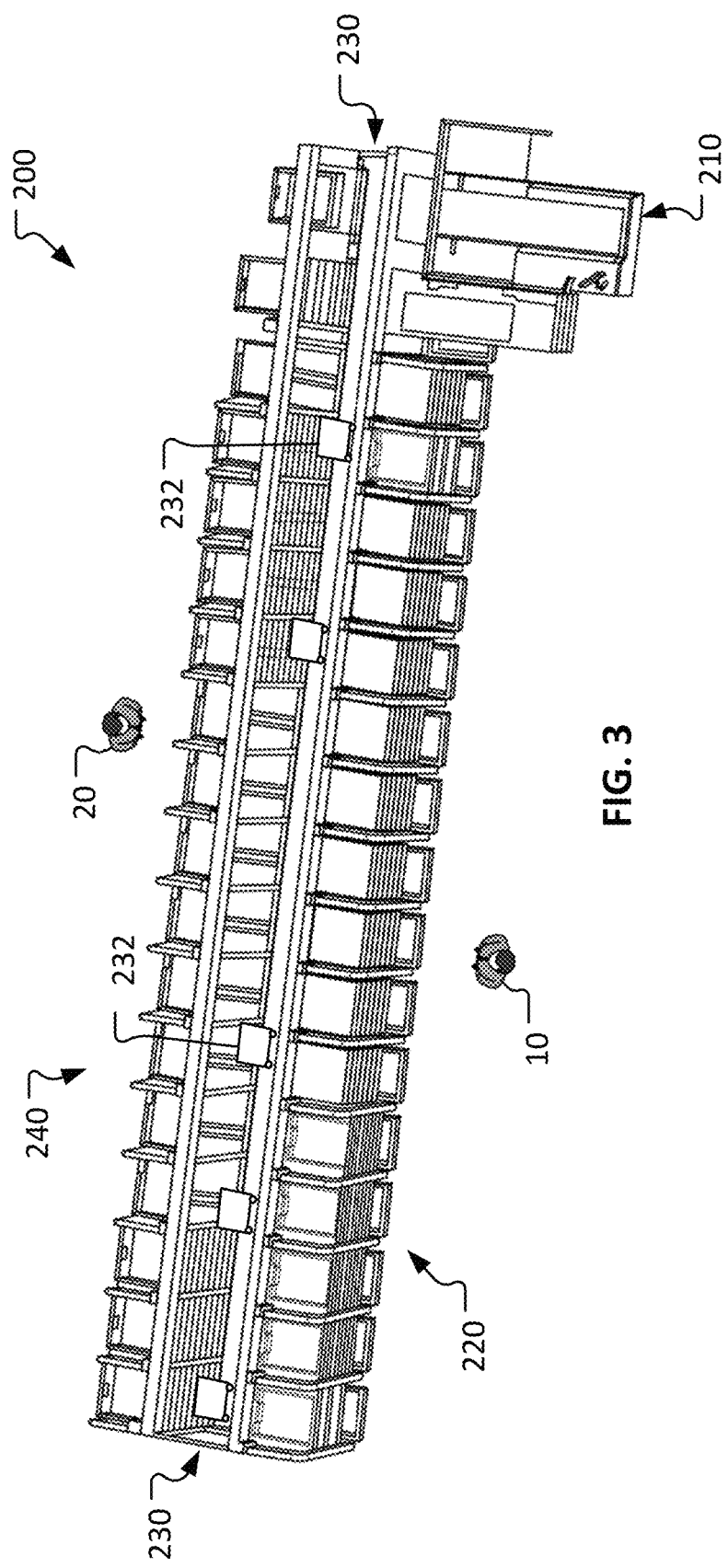
FIG. 3 is another view of the order sortation system of FIG. 2.

FIGS. 2 and 3 illustrate an example automatic order sortation system 200. The purpose of the order sortation system 200 is to efficiently sort a large quantity of a variety of different types of items into the proper combinations of line items to fulfill multiple individual orders.

Unsorted items 190 can be transported from an inventory storage location to the order sortation system 200 via a conveyor 192 and/or using various other types of material handling systems (e.g., mobile robots, AGVs, etc.). The unsorted items 190 can be inducted into the order sortation system 200 by a worker (or robotically) via an induction system 210.

The induction system 210 can determine the identity of each of the unsorted items 190 individually (e.g., using a bar code scanner, RFID reader, visually, etc.). From there, as described further below, the order sortation system 200 can perform the task of automatically sorting the inducted items into the proper combinations of items to fulfill the individual orders being processed, resulting in completed individual orders contained in respective individual receptacles in a matrix of receptacle stations 220.

For example, a first order being processed by the order sortation system 200 may be for a quantity of two of item A and one of item B. A second order being processed by the order sortation system 200 may be for a quantity of four of item B and two of item C. A third order being processed by the order sortation system 200 may be for a quantity of two of item A, one of item B, and one of item C. In total then, the three orders require four of item A, six of item B, and three of item C. Accordingly, in this example the unsorted items 190 would include, at least, four of item A, six of item B, and three of item C. After the induction of the unsorted items 190 into the order sortation system 200 on an individual item-by-item basis via the induction system 210, the order sortation system 200 will singularly automatically transport all of the items for the first order to a first receptacle in the matrix of receptacle stations 220, singularly automatically transport all of the items for the second order to a second receptacle in the matrix of receptacle stations 220, and singularly automatically transport all of the items for the third order to a third receptacle in the matrix of receptacle stations 220. Accordingly, when the order sortation system 100 is finished sorting the three orders, the first receptacle will contain two of item A and one of item B (as per the first order), the second receptacle will contain four of item B and two of item C (as per the second order), and the third receptacle will contain two of item A, one of item B, and one of item C (as per the third order).

When the sortation of an individual order has been completed (such that a receptacle contains all of the items for the individual order) the order sortation system 200 will notify a worker 10 attending to the matrix of receptacle stations 220 so that the worker 10 can move the ordered items from the receptacle to a next operation (e.g., to a packaging operation in preparation for shipping the order). In some cases, the order sortation system 200 will utilize signal lights 222 to notify the worker 10 when a receptacle contains all of the items for the individual order. In response, in some cases the worker 10 will simply remove the receptacle containing the items from the matrix of receptacle stations 220 and then transfer the items from the receptacle to a box for shipment. The order 10 can then replace the receptacle back into an open receptacle station of the matrix of receptacle stations 220.

FIG. 3 shows that the example order sortation system 200 includes an item transportation system 230 and a second matrix of receptacle stations 240. In other words, the order sortation system 200 includes a first matrix of receptacle stations 220 and a second matrix of receptacle stations 240. The first matrix of receptacle stations 220 and the second matrix of receptacle stations 240 are arranged parallel to each other. The first matrix of receptacle stations 220 and the second matrix of receptacle stations 240 are separated by the item transportation system 230.

The item transportation system 230 includes a plurality of multi-directional item transport vehicles 232. Each of the item transport vehicles 232 is configured to travel along the automated order sortation system 200 and to autonomously transport singular items from the induction system 210 to the appropriate/assigned receptacle located in one of the positions of either the first matrix of receptacle stations 220 or the second matrix of receptacle stations 240. The item transport vehicles 232 are configured to autonomously transfer the item being carried into the appropriate/assigned receptacle. In some embodiments, after an item transport vehicle 232 has transferred into a receptacle the item it was carrying, then the item transport vehicle 232 will travel back to the induction system 210 along the lowest level of the item transportation system 230. Accordingly, it can be said that there is a high level of traffic along the lowest level of the item transportation system 230 and at levels near thereto.

Workers 10 and 20 attend to the first matrix of receptacle stations 220 and the second matrix of receptacle stations 240 respectively.

Figure 4:
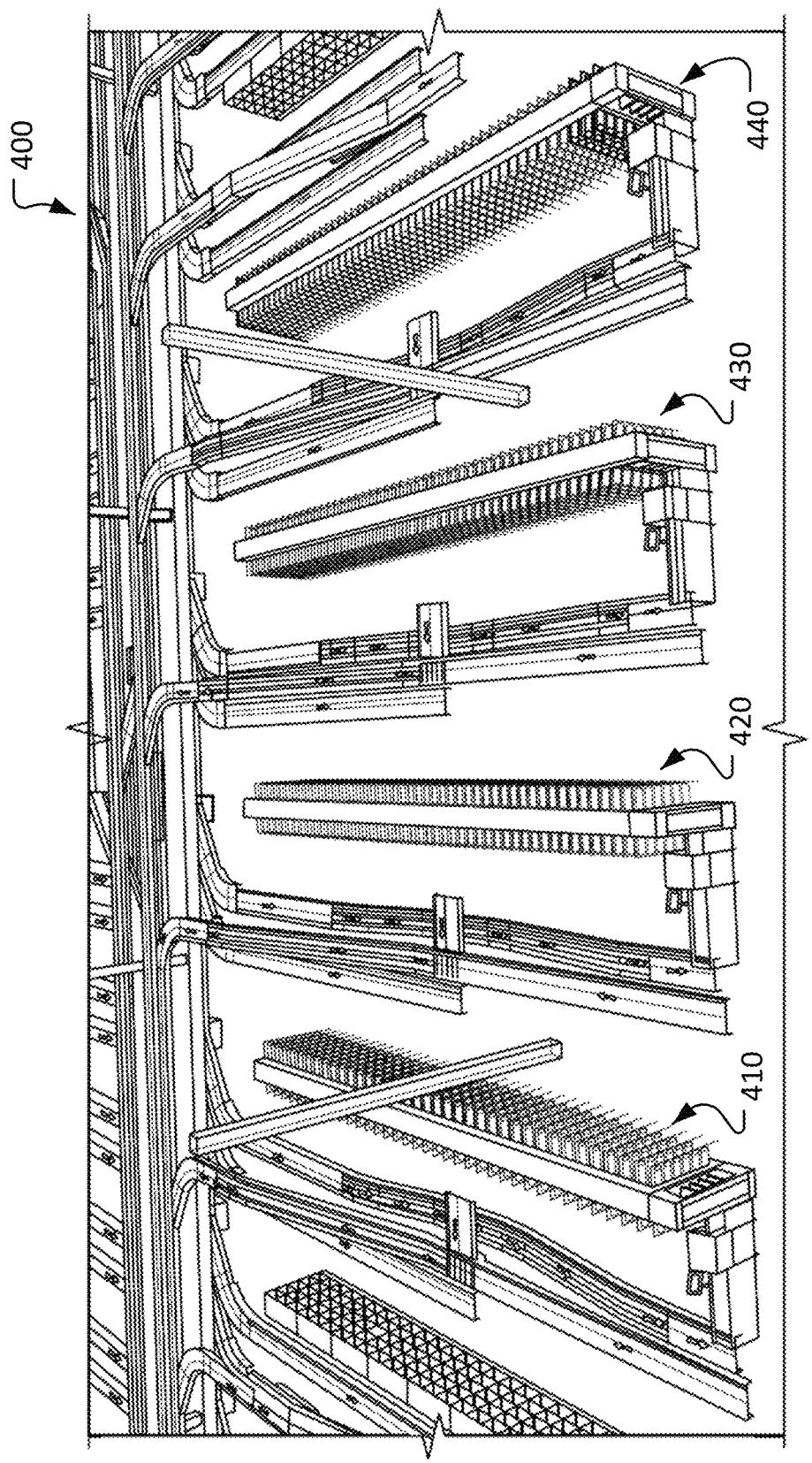
FIG. 4 illustrates a warehouse with multiple parallel order sortation systems like the order sortation system of FIG. 2.

FIG. 4 shows an example order sortation process 400 that includes multiple (four in this example) order sortation systems 410, 420, 430, and 440 arranged to operate in parallel with each other. In some embodiments, each of the depicted order sortation systems 410, 420, 430, and 440 can be the same as, or essentially similar to, the automated order sortation system 200 described above. In other words, the four order sortation systems 410, 420, 430, and 440 depicted in FIG. 4 can be four of the automated order sortation systems 200 arranged in parallel. In some embodiments, other types of order sortation systems (and combinations of different types of systems) can be used without departing from the innovative aspects for operating the multiple order sortation systems as described herein.

The depicted example order sortation process 400 includes a first order sortation system 410, a second order sortation system 420, a third order sortation system 430, and a fourth order sortation system 440. While four order sortation systems are depicted, it should be understood that the innovative aspects described herein can be applied to order sortation processes that include any number of order sortation systems, such as two, three, four, five, six, seven, eight, nine, ten, eleven, twelve, and more than twelve.

The order sortation systems 410, 420, 430, and 440 are supplied with items to be sorted for orders from a conveyor system that is shared by the order sortation systems 410, 420, 430, and 440. That is, items needing sortation can be sent to any particular one of the order sortation systems 410, 420, 430, and 440.

A control system can control the conveyor system to transport items for sortation to any particular one of the order sortation systems 410, 420, 430, and 440. In some embodiments, the control system uses a configurable strategic scheme for determining which of the order sortation systems 410, 420, 430, and 440 that particular items should be transported to. In other words, a configurable strategic scheme can be used for loading/utilizing the capacity of the order sortation systems 410, 420, 430, and 440. The strategic schemes can cause the order sortation process 400 to operate so as to optimize the efficiency of the order sortation process 400 by, for example, highly utilizing human labor and minimizing material flow delays.

In some embodiments, the strategic scheme operated by the control system of the order sortation process 400 can be configurable. Accordingly, the parameters of the strategic scheme that the control system will use to decide which of the order sortation systems 410, 420, 430, and 440 to send items to via the conveyor system are selectable/configurable by a person (e.g., a management person), or by an automated algorithm. Various types of parametric selections, and modifications of such parametric selections, may be made from day-to-day, shift-to-shift, or within a shift in accordance with practical aspects related to the order sortation process 400 such as staffing levels, system maintenance needs, sortation process volume requirements, types of items to be sorted, and so on.

Examples of some strategic control schemes for controlling the order sortation process 400, including order sortation systems 410, 420, 430, and 440, are described next. In a first example, it is assumed that the order sortation system 410 has been selectively configured in the control system of the order sortation process 400 as the primary sortation system; the order sortation system 420 has been configured to be the secondary sortation system; the order sortation system 430 has been configured to be the tertiary order sortation system; and the order sortation system 440 has been configured to be the quaternary order sortation system. Hence, as described further below, utilization of the order sortation system 410 is the first priority. Utilization of the order sortation system 420 is the second priority. Utilization of the order sortation system 430 is the third priority. Utilization of the order sortation system 440 is the fourth priority. However, the order sortation systems 410, 420, 430, and 440 can be configured in any arrangement of prioritization.

Accordingly, initially, items for sortation by the order sortation process 400 are sent exclusively to the primary order sortation system 410. In accordance with this example strategic control scheme for controlling the order sortation process 400, items for sortation will continue to be routed exclusively to the order sortation system 410 until it is loaded to a particular threshold capacity percentage. Thereafter, items will begin to be routed to the order sortation system 420 (because in this example it has been configured as the secondary sortation system). If/when the primary order sortation system 410 falls back below the threshold capacity percentage, items will thereafter be routed to the primary order sortation system 410, until the primary order sortation system 410 is back up to the threshold capacity percentage.

The threshold capacity percentage can be a selectively configurable parameter. For example, the threshold capacity percentage can be set at a level such as 10%, 20%, 30%, 40%, 50%, 60%, 70%, 80%, 90%, or 100% (or any other desired level of capacity). In this example, the level of 50% will be used as a non-limiting example threshold capacity percentage.

So, when the primary order sortation system 410 reaches 50% utilization, then items for sortation will begin to be routed to the secondary order sortation system 420. Thereafter, items will continue to be routed to the secondary order sortation system 420 (with the exception that items will be routed to the primary order sortation system 410 whenever it falls back below 50% utilization). In fact, items will continue to be routed to the secondary order sortation system 420 until its utilization reaches 50%. Then, items will be routed to the tertiary order sortation system 430. Thereafter, items will continue to be routed to the tertiary order sortation system 430 (with the exception that items will be routed to the primary order sortation system 410 whenever it falls back below 50% utilization (highest priority), and to the secondary order sortation system 420 whenever it falls back below 50% utilization (second highest priority)).

The above strategic control scheme for controlling the order sortation process 400 will continue to be followed until each of the order sortation systems 410, 420, and 430 are utilized at 50% of capacity. Thereafter, items will be routed to the order sortation systems 410, 420, and 430 in a manner that balances their utilization in an essentially equal manner. In other words, items will be routed to the order sortation systems 410, 420, and 430 so that each is utilized at whatever equal percentage of their capacity is needed to keep up with the demand for item sortation by the order sortation process 400. That equal percentage of utilization for each of the order sortation systems 410, 420, and 430 could equal 67%, for example, or any equal percentage of their capacities (up to 100%). During that phase while the utilizations of the order sortation systems 410, 420, and 430 are balanced at some percentage greater than 50%, priority is given to whichever of the order sortation systems 410, 420, and 430 has the lowest utilization percentage. If the utilization percentages are equal, then first priority is given to the primary order sortation system 410, and second priority is given to secondary order sortation system 420.

If all three of the order sortation systems 410, 420, and 430 reach 100% capacity, then items will begin to be routed to the quaternary order sortation system 440. While the order sortation system 440 is being utilized, priority is given to keeping the order sortation systems 410, 420, and 430 at 100% capacity. In other words, items will be routed to the order sortation systems 410, 420, and 430 whenever they fall below 100% capacity (as a higher priority than sending items to the quaternary order sortation system 440). Hence, it can be said that the order sortation system 440 is an overflow system.

In sum, the above example includes tiers of priority in the following order: (1) filling the primary order sortation system 410 to 50% utilization, (2) filling the secondary order sortation system 420 to 50% utilization, (3) filling the tertiary order sortation system 430 to 50% utilization, (4) equally balancing the utilization of the order sortation systems 410, 420, and 430 until they reach 100% utilization, and (5) filing the quaternary order sortation system 440 until it reaches 100% utilization.

Figure 5:
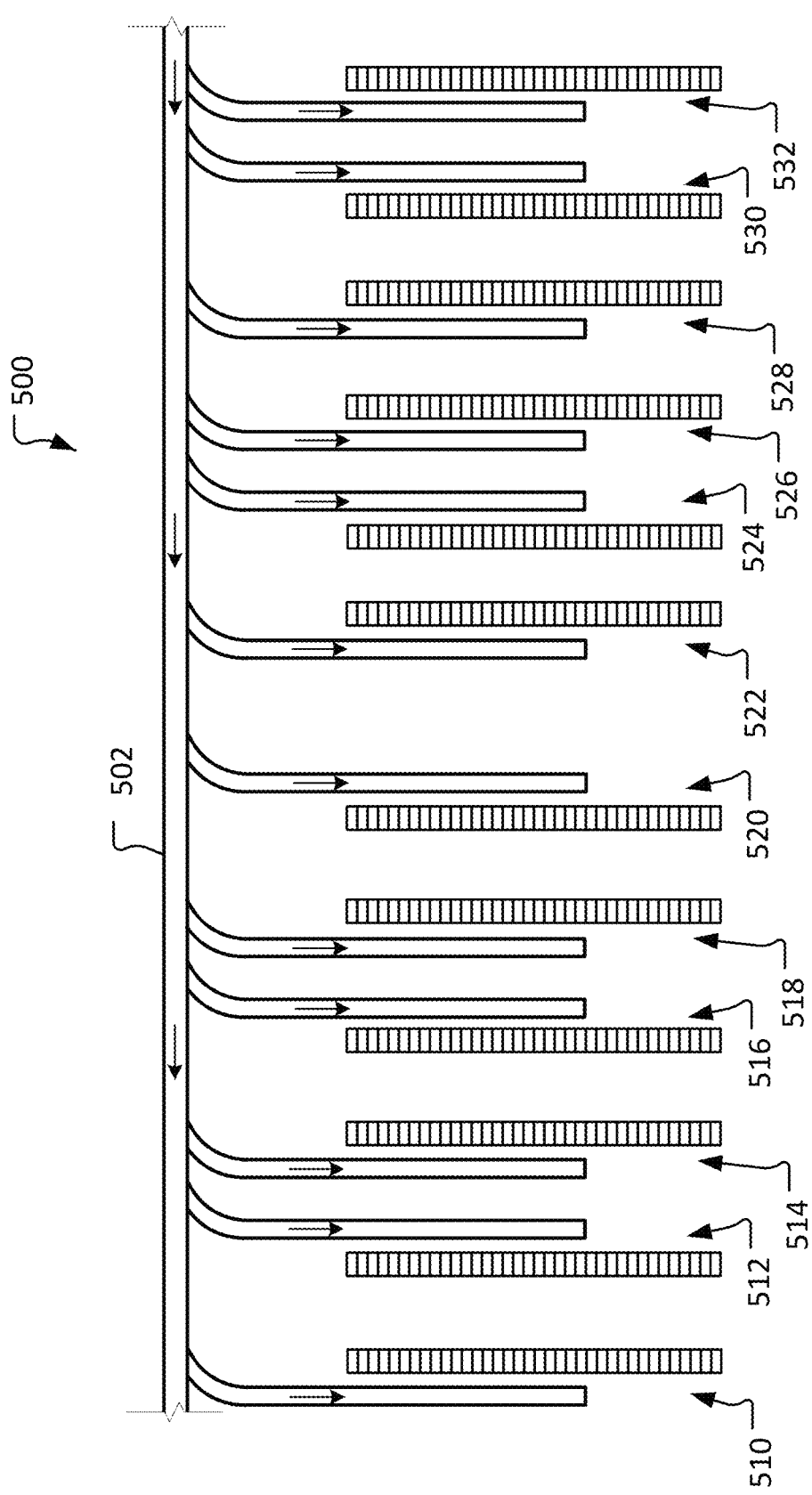
FIG. 5 schematically illustrates multiple parallel manual order sortation systems in accordance with some embodiments.

Referring now to FIG. 5, while the sortation systems described above are automated systems, in some cases a manual order sortation process 500 is used to sort items into ordered combinations of items. In the depicted example, the manual order sortation process 500 includes twelve manual order sortation lines 510, 512, 514, 516, 518, 520, 522, 524, 528, 530, and 532 that can each receive items from a main conveyor 502. Each of the manual order sortation lines 510, 512, 514, 516, 518, 520, 522, 524, 528, 530, and 532 includes a branch conveyor that can receive items for sortation that are traveling along the main conveyor 502. The items are sent down the branch conveyor of a particular manual order sortation line 510, 512, 514, 516, 518, 520, 522, 524, 528, 530, or 532 in accordance with a strategic control scheme as described further below.

When a manual order sortation line 510, 512, 514, 516, 518, 520, 522, 524, 528, 530, or 532 is being utilized, a human worker will scan the barcode label(s) of the item(s) on the branch conveyor of the manual order sortation line 510, 512, 514, 516, 518, 520, 522, 524, 528, 530, or 532 so that the control system can identify the item(s). The worker will then be provided with an instruction from the control system to place the item(s) in a particular location of multiple locations associated with the manual order sortation line 510, 512, 514, 516, 518, 520, 522, 524, 528, 530, or 532. In some embodiments, a storage receptacle such as a bin or box will be located in each of the multiple locations associated with the manual order sortation line 510, 512, 514, 516, 518, 520, 522, 524, 528, 530, or 532. When all of the items for a particular order have been placed in the particular location, then the worker will transfer the items to the next step in the process, such as packaging or shipping.

An example strategic control scheme for controlling the manual order sortation process 500 will now be described. The control system for the manual order sortation process 500 can be configured to operate the manual order sortation process 500 in a desired manner. For example, without limitation, the manual order sortation line 510 can be selectively established or configured in the control system as the primary ($1^{st}$ priority) sortation line; the manual order sortation line 520 can be selectively established or configured in the control system as the secondary ($2^{nd}$ priority) sortation line; the manual order sortation line 522 can be selectively established or configured in the control system as the tertiary ($3^{rd}$ priority) sortation line; the manual order sortation line 512 can be selectively established or configured in the control system as the quaternary ($4^{th}$ priority) sortation line; the manual order sortation line 518 can be selectively established or configured in the control system as the quinary ($5^{th}$ priority) sortation line; the manual order sortation line 524 can be selectively established or configured in the control system as the senary ($6^{th}$ priority)

sortation line; the manual order sortation lines 514, 516, and 526 can be collectively selectively established or configured in the control system as the septenary ($7^{th}$ priority) sortation lines; and the manual order sortation lines 528, 530, and 532 can be selectively established or configured in the control system as idle. Again, it should be understood that the above manner for selectively configuring the control system is simply an example by which to describe the flexible innovative concepts for controlling the manual order sortation process 500, as disclosed herein. In fact, the manual order sortation lines 510, 512, 514, 516, 518, 520, 522, 524, 528, 530, and/or 532 can be selectively configured to operate in any combination of: (i) active or idle, and (ii) order of priority of the active lines.

As with the strategic control scheme described above in reference to FIG. 4, a threshold capacity percentage can be a selectively configured in the control system for the manual order sortation process 500. For example, the threshold capacity percentage can be set at a level such as 10%, 20%, 30%, 40%, 50%, 60%, 70%, 80%, 90%, or 100% (or any other desired level of capacity). In this example, the level of 50% will be used as a non-limiting example threshold capacity percentage.

In accordance with this illustrative example, items for sortation by the manual order sortation process 500 are initially sent exclusively to the primary manual order sortation line 510. In accordance with this example strategic control scheme for controlling the order sortation process 400, items for sortation will continue to be routed exclusively to the primary manual order sortation line 510 until it is loaded to a particular threshold capacity percentage (50% in this example). Thereafter, items will begin to be routed to the manual order sortation line 520 (because in this example it has been configured as the secondary sortation line). If/when the primary manual order sortation line 510 falls back below the threshold capacity percentage of 50%, items will thereafter be routed to the primary manual order sortation line 510, until the primary manual order sortation line 510 is back up to the threshold capacity percentage of 50%.

So, when the primary manual order sortation line 510, reaches 50% utilization, then items for sortation will begin to be routed to the secondary manual order sortation line 520. Thereafter, items will continue to be routed to the secondary manual order sortation line 520 (with the exception that items will be routed to the primary manual order sortation line 510 whenever it falls back below 50% utilization). In fact, items will continue to be routed to the secondary manual order sortation line 520 until its utilization reaches 50% (the threshold capacity percentage in this example). Then, items will be routed to the tertiary order sortation system 430. Thereafter, items will continue to be routed to the tertiary manual order sortation line 522 (with the exception that items will be routed to the primary manual order sortation line 510 whenever it falls back below 50% utilization (highest priority), and to the secondary manual order sortation line 520 whenever it falls back below 50% utilization (second highest priority)).

When each of the primary manual order sortation line 510, the secondary manual order sortation line 520, and the tertiary manual order sortation line 522 are utilized at 50% of their capacity, then items will begin to be routed to the quaternary manual order sortation line 512 until it is utilized at 50% of its capacity (with the exception that items will be routed to higher priority lines if they fall below 50% utilization). Then, in like manner, items will begin to be routed to the quinary manual order sortation line 518 until it is utilized at 50% of its capacity (with the exception that items will be routed to higher priority lines if they fall below 50% utilization). Then, in like manner, items will begin to be routed to the senary manual order sortation line 524 until it is utilized at 50% of its capacity (with the exception that items will be routed to higher priority lines if they fall below 50% utilization).

When each of the manual sortation lines 510, 520, 522, 512, 518, and 524 is at 50% utilization, items will be routed to the manual sortation lines 510, 520, 522, 512, 518, and 524 in a manner that balances their utilization in an essentially equal manner. In other words, items will be routed to the manual sortation lines 510, 520, 522, 512, 518, and 524 so that each is utilized at whatever equal percentage of their capacity is needed to keep up with the demand for item sortation by the manual order sortation process 500. That equal percentage of utilization for each of the manual sortation lines 510, 520, 522, 512, 518, and 524 could equal 81%, for example, or any equal percentage of their capacities (up to 100%). During that phase while the utilizations of the manual sortation lines 510, 520, 522, 512, 518, and 524 are balanced at some percentage greater than 50%, priority is given to whichever of the manual sortation lines 510, 520, 522, 512, 518, or 524 has the lowest utilization percentage. If the utilization percentages are equal, then first priority is given to the primary manual order sortation line 510, second priority is given to the secondary manual order sortation line 520, third priority is given to the tertiary manual order sortation line 522, and so on.

If all six of the manual sortation lines 510, 520, 522, 512, 518, and 524 reach 100% capacity, then items will begin to be routed to the septenary manual order sortation lines 514, 516, and 526. While the septenary manual order sortation lines 514, 516, and 526 are being utilized, priority is given to keeping the manual sortation lines 510, 520, 522, 512, 518, and 524 at 100% capacity. In other words, items will be routed to the manual sortation lines 510, 520, 522, 512, 518, and 524 whenever they fall below 100% capacity (as a higher priority than sending items to the septenary manual order sortation lines 514, 516, and 526). Hence, it can be said that the septenary manual order sortation lines 514, 516, and 526 are configured as overflow lines. While in this example there are three overflow lines, in some cases there is only a single overflow line.

In sum, the above example includes tiers of priority in the following order: (1) filling the primary manual order sortation line 510 to 50% utilization, (2) filling the secondary manual order sortation line 520 to 50% utilization, (3) filling the tertiary manual order sortation line 522 to 50% utilization, (4) filling the quaternary manual order sortation line 512 to 50% utilization, (5) filling the quinary manual order sortation line 518 to 50% utilization, (6) filling the senary manual order sortation line 524 to 50% utilization, (7) equally balancing the utilization of the manual sortation lines 510, 520, 522, 512, 518, and 524 until they reach 100% utilization, and (5) filing the septenary manual order sortation lines 514, 516, and 526 (overflow lines) until they reach 100% utilization.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Various implementations of the systems and techniques described here can be realized in one or more computer programs that are executable and/or interpretable on a programmable system including at least one programmable processor, which may be special or general purpose, coupled to receive data and instructions from, and to transmit data and instructions to, a storage system, at least one input device, and at least one output device.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, a trackball, or a touchscreen, etc.) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, tactile input, eye movement tracking input, a brain-computer interface, gesture input, and the like, and combinations thereof).

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

What is claimed is:

1. A method of operating an order sortation process comprising a plurality of order sortation lines, the method comprising:
   receiving, by a control system of the order sortation process, one or more configuration parameters associated with the plurality of order sortation lines, wherein the one or more configuration parameters includes a threshold capacity level;
   controlling, by the control system, a conveyance system to convey items for orders being sorted by the order sortation process to a first order sortation line of the plurality of order sortation lines, wherein the one or more configuration parameters identifies the first order sortation line as a primary priority order sortation line; and
   in response to a utilization of the first order sortation line reaching the threshold capacity level, controlling, by the control system, the conveyance system to convey the items for the orders being sorted by the order sortation process to a second order sortation line of the plurality of order sortation lines, wherein the one or more configuration parameters identifies the second order sortation line as a secondary priority order sortation line.

2. The method of claim 1, further comprising:
   in response to the utilization of the first order sortation line falling below the threshold capacity level, controlling, by the control system, the conveyance system to convey the items for the orders being sorted by the order sortation process to the first order sortation line instead of to the second order sortation line.

3. The method of claim 1, further comprising:
   in response to the utilization of the first and second order sortation lines reaching the threshold capacity level, controlling, by the control system, the conveyance system to convey the items for the orders being sorted by the order sortation process to a third order sortation line of the plurality of order sortation lines, wherein the one or more configuration parameters identifies the third order sortation line as a tertiary priority order sortation line.

4. The method of claim 3, further comprising:
   in response to the utilization of the first, second, and third order sortation lines reaching the threshold capacity level, controlling, by the control system, the conveyance system to convey the items for the orders being sorted by the order sortation process to the first, second, or third order sortation lines in a manner that attempts to equally utilize the first, second, and third order sortation lines in a balanced manner.

5. The method of claim 4, further comprising:
   in response to the utilization of the first, second, and third order sortation lines reaching full capacity levels, controlling, by the control system, the conveyance system to convey the items for the orders being sorted by the order sortation process to a fourth order sortation line of the plurality of order sortation lines, wherein the one or more configuration parameters identifies the fourth order sortation line as a quaternary priority order sortation line.

6. The method of claim 5, further comprising:
in response to the utilization of the first, second, or third order sortation line falling below the full capacity level, controlling, by the control system, the conveyance system to convey the items for the orders being sorted by the order sortation process to the first, second, or third order sortation line instead of to the fourth order sortation line.

7. The method of claim 1, wherein the threshold capacity level is 50%.

8. The method of claim 1, wherein the one or more configuration parameters identifies a third order sortation line as a tertiary priority order sortation line.

9. The method of claim 8, wherein the one or more configuration parameters identifies a fourth order sortation line as a quaternary priority order sortation line.

10. The method of claim 1, wherein the order sortation process is a manual order sortation process.

11. The method of claim 1, wherein the order sortation process is an automated order sortation process.

12. An order sortation system, comprising:
a conveyance system;
a plurality of order sortation lines arranged to receive, from the conveyor, items for orders to be sorted by the order sortation system; and
a control system configured to receive and utilize, for controlling the order sortation system, one or more configuration parameters associated with the plurality of order sortation lines, wherein the one or more configuration parameters includes a threshold capacity level and a relative prioritization of first, second, and third order sortation lines of the plurality of order sortation lines.

13. The system of claim 12, wherein the conveyance system comprises a conveyor.

14. The system of claim 12, wherein the conveyance system comprises a plurality of mobile robots or automated guided vehicles.

15. The system of claim 12, wherein the control system is configured to:
control the conveyance system to convey the items for the orders being sorted by the order sortation system to the first order sortation line, wherein the one or more configuration parameters identifies the first order sortation line as a primary priority order sortation line; and
in response to a utilization of the first order sortation line reaching the threshold capacity level, control the conveyance system to convey the items for the orders being sorted by the order sortation process to the second order sortation line of the plurality of order sortation lines, wherein the one or more configuration parameters identifies the second order sortation line as a secondary priority order sortation line.

16. The system of claim 15, wherein the control system is configured to, in response to the utilization of the first order sortation line falling below the threshold capacity level, control the conveyance system to convey the items for the orders being sorted by the order sortation process to the first order sortation line instead of to the second order sortation line.

17. The system of claim 15, wherein the control system is configured to, in response to the utilization of the first and second order sortation lines reaching the threshold capacity level, controlling, by the control system, the conveyance system to convey the items for the orders being sorted by the order sortation process to the third order sortation line of the plurality of order sortation lines, wherein the one or more configuration parameters identifies the third order sortation line as a tertiary priority order sortation line.

18. The system of claim 17, wherein the control system is configured to, in response to the utilization of the first, second, and third order sortation lines reaching the threshold capacity level, control the conveyance system to convey the items for the orders being sorted by the order sortation process to the first, second, or third order sortation lines in a manner that attempts to equally utilize the first, second, and third order sortation lines in a balanced manner.

19. The system of claim 18, wherein the control system is configured to, in response to the utilization of the first, second, and third order sortation lines reaching full capacity levels, control the conveyance system to convey the items for the orders being sorted by the order sortation process to a fourth order sortation line of the plurality of order sortation lines, wherein the one or more configuration parameters identifies the fourth order sortation line as a quaternary priority order sortation line.

20. The system of claim 19, wherein the control system is configured to, in response to the utilization of the first, second, or third order sortation line falling below the full capacity level, control the conveyance system to convey the items for the orders being sorted by the order sortation process to the first, second, or third order sortation line instead of to the fourth order sortation line.

* * * * *